US006891856B2

(12) United States Patent
Umayabashi

(10) Patent No.: US 6,891,856 B2
(45) Date of Patent: May 10, 2005

(54) DELAY-COMPENSATED TIMESLOT ASSIGNMENT METHOD AND SYSTEM FOR POINT-TO-MULTIPOINT COMMUNICATION NETWORKS

(75) Inventor: Masaki Umayabashi, Tokyo (JP)

(73) Assignee: NEC Corporation, Tokyo (JP)

( * ) Notice: Subject to any disclaimer, the term of this patent is extended or adjusted under 35 U.S.C. 154(b) by 824 days.

(21) Appl. No.: 09/761,983

(22) Filed: Jan. 17, 2001

(65) Prior Publication Data

US 2001/0008533 A1 Jul. 19, 2001

(30) Foreign Application Priority Data

Jan. 19, 2000 (JP) ........................................ 2000-009608

(51) Int. Cl.[7] .................................................. H04J 3/16
(52) U.S. Cl. .................... 370/468; 370/419; 370/395.1; 370/395.4; 370/498; 370/499
(58) Field of Search ............................... 370/468, 465, 370/470, 473, 498, 499, 516, 522, 532, 537, 538, 419, 312, 352, 528, 435, 440, 519, 517, 395.4; 375/130, 142, 141

(56) References Cited

U.S. PATENT DOCUMENTS

| 3,988,545 | A | | 10/1976 | Kuemmerle et al. | |
|---|---|---|---|---|---|
| 5,210,750 | A | * | 5/1993 | Nassehi et al. | 370/440 |
| 5,226,044 | A | * | 7/1993 | Gupta et al. | 370/435 |
| 5,363,373 | A | * | 11/1994 | Nakahara et al. | 370/314 |
| 5,515,371 | A | * | 5/1996 | Venters | 370/517 |
| 5,570,355 | A | * | 10/1996 | Dail et al. | 370/352 |
| 5,572,517 | A | * | 11/1996 | Safadi | 370/431 |
| 5,940,403 | A | * | 8/1999 | Williams | 370/465 |
| 6,370,125 | B1 | * | 4/2002 | Belk | 370/312 |
| 6,487,222 | B1 | * | 11/2002 | Williams | 370/536 |

FOREIGN PATENT DOCUMENTS

| EP | 0 544 975 A1 | 6/1993 |
|---|---|---|
| JP | 58-218250 | 12/1983 |
| JP | 9-214459 | 8/1997 |
| JP | 10-242981 | 9/1998 |

OTHER PUBLICATIONS

Copy of Japanese Office Action dated Sep. 9, 2003 (and English translation of relevant portion).

Umayabashi et al., Proposal of Dynamic Bandwidth Allocation Control Scheme for ATM–PON Systems, The Institute of Electronics Information and Communication Engineers Technical Report, SSE98–226, IN98–198 (Mar. 1999).

(Continued)

*Primary Examiner*—Phirin Sam
*Assistant Examiner*—Anthony Ton
(74) *Attorney, Agent, or Firm*—Dickstein, Shapiro, Morin & Oshinsky, LLP.

(57) ABSTRACT

In a communication network, end-user systems are connected via a common transmission medium to a timeslot assignment unit. Each end-user system has a buffer for storing packets, and a queue length detector for detecting a queue length of the stored packets. The end-user system forwards packets on assigned timeslots to the network and transmits a signal for indicating the detected queue length to the assignment unit. The timeslot assignment unit maintains timeslot records to store count numbers of assigned timeslots, determines a total count number of timeslots assigned to each end-user system during a period corresponding to the delay time of the unit, and receives a queue length signal from each end-user system. From the total count number and the queue length a virtual queue length is determined for indicating the number of packets to which timeslots are still not assigned. Based on the virtual queue length, timeslots are assigned to each end-user system.

19 Claims, 10 Drawing Sheets

OTHER PUBLICATIONS

Umayabashi et al., Proposal of Dynamic Bandwidth Assignment Scheme, Improving Performance Degradation Caused by Control Delay in ATM–PON Systems, Proceedings of the 2000 IEICE General Conference, B–8–1 (2000).

Miyabe et al., ATM Pon, Dynamic bandwidth allocation for ATM–PON, Proceedings of the 1998 IEICE General Conference, B–8–36 (1998).

Yuki et al., IP–based PON, Dynamic Rate Assign Technique for IP–based Passive Optical Networks, B–8–8 (1998).

Copy of Japanese Office Action dated Mar. 23, 2004 (and English translation of relevant portion).

* cited by examiner

First Control Logic 30A

DELAY-COMPENSATED TIMESLOT ASSIGNMENT METHOD AND SYSTEM FOR POINT-TO-MULTIPOINT COMMUNICATION NETWORKS

BACKGROUND OF THE INVENTION

1. Field of the Invention

The present invention relates to a packet communication system and a method of assigning timeslots of the system. The present invention is particularly concerned with a dynamic timeslot assignment method for a common medium point-to-multipoint communication system in which multiple local units are connected to a network unit via a common transmission medium and the network unit dynamically assigns timeslots to the local units under varying traffic.

2. Description of the Related Art

A prior art point-to-multipoint communication system is comprised of a plurality of line concentrators on the user side of the system and a timeslot assignment unit on the network side. Each line concentrator multiplexes (i.e., concentrates) traffic from a plurality of user terminals onto an optical local access line which is coupled by an optical coupler to a common optical line. Each line concentrator includes a buffer for temporarily storing ATM cells received from the associated user terminals and a queue length detector is provided to count the number of outstanding cells in the buffer that form a queue waiting for transmission and sends a queue length signal to the timeslot assignment unit. In order to provide efficient utilization of the common medium for bursty traffic, the timeslot assignment unit dynamically assigns timeslots to the line concentrators based on the queue lengths of the line concentrators, as disclosed in Japanese Patent Publication 10-242981. According to the prior art timeslot assignment technique, timeslots are assigned to each line concentrator at periodic intervals S as shown in FIG. 1, where the interval S equals to or an integral multiple of the length of a frame. At each assignment time, the timeslot assignment unit determines the number of timeslots to be assigned to each line concentrator during each interval S, and then determines the number of timeslots to be assigned during each frame if the assignment interval S is an integral multiple of the frame length and their position within a frame to produce a slot position signal, which is sent to each line concentrator.

However, there is an inherent control delay in this timeslot assignment process. Specifically, this control delay is a total sum of the intervals for timeslot assignment calculations, the propagation delay time, and the time to establish synchronization with system clock at each side of the network.

As shown in FIG. 1, at time $t_0$, each line concentrator communicates a queue length signal $Q_0=100$ to the timeslot assignment unit 13, indicating that there are one-hundred ATM cells forming a queue in the buffer 6. As long as they remain in the buffer, queue length signals $Q_0$ will be transmitted at update intervals. Based on a received queue length signal, the timeslot assignment unit 13 calculates the count number $G_0$ (=40, for example) of timeslots to be assigned during an assignment period $S_0$. If the update interval S is equal to the length of a frame, the assignment unit 13 determines the slot positions of assigned timeslots in a frame at time $t_1-\alpha$ and sends a signal $g_{0-i}$ to the associated line concentrator for indicating the frame-by-frame timeslot count number and the timeslot position (where i indicates frame number). Timeslot assignment unit 13 successively calculates the numbers of timeslots $G_1=50$ and $G_2=60$ at times $t_2-\alpha$ and $t_3-\alpha$ in response to queue length signals $Q_1=100$ and $Q_2=100$ and produces timeslot identification signals $g_{1-i}$ and $g_{2-i}$.

It is seen that the value $G_0=40$ produced at time $t_0$ is actually used by the line concentrator at time $t_3$ that is delayed by a period of 3S with respect to time $t_0$. In the same way, the assigned timeslot count numbers $G_1=50$ and $G_2=60$ produced at times $t_1$ and $t_2$ are actually used by the concentrator at times $t_4$ and $t_5$. The presence of such control delay implies that there are cells in the buffer 6 which were already assigned timeslots but are still waiting for their turn to be forwarded to the network. For example, at time $t_3$, there are 100 outstanding cells in the buffer that were already assigned timeslots whose total number equals 150 (=40+50+60).

However, because of the delay time fifty timeslots are unnecessarily assigned to the one-hundred outstanding cells. Since the surplus timeslots are not used by the line concentrators, they result in a low throughput in cell transfer. In addition, the delay time associated with the outstanding cells in the buffer and hence the buffer capacity for a given cell loss rate is proportional to the length of the queue. Due to the low cell transfer throughput, there is an increase in cell delay, hence an increase in required buffer capacity.

SUMMARY OF THE INVENTION

It is therefore an object of the present invention to provide a delay-compensated method and system for a packet communication network in which timeslots are not repeatedly assigned to the same packets.

According to a first aspect, the present invention provides a timeslot assignment method for a communication system in which a plurality of end-user systems are connected to a timeslot assignment unit via a common transmission medium, each of the end-user systems comprising a buffer for storing packets of either variable or constant length and forwarding packets from the buffer on assigned timeslots, the method comprising the steps of (a) determining a first count number of said packets in the buffer of each end-user system, (b) determining a second, total count number of timeslots previously assigned to each end-user system during a delay time period of the timeslot assignment unit, (c) using said first and second count numbers for determining a third count number of packets in said buffer to which timeslots are not assigned, and (d) assigning timeslots to packets of each end-user system based on said third count number.

According to a second aspect of the present invention, there is provided a communication system comprising a plurality of end-user systems and a timeslot assignment unit connected via a common transmission medium to the end-user systems. Each of the end-user systems comprises a buffer for storing packets of either variable or constant length, a queue length detector for detecting a queue length indicating a count number of said packets in the buffer, and a controller for forwarding packets from the buffer on timeslots assigned by the timeslot assignment unit and transmitting a signal to the timeslot assignment unit for indicating the detected queue length. The timeslot assignment unit comprises a timeslot count table having a plurality of entries corresponding to the end-user systems. Each of the entries has a length corresponding to a delay time period of the timeslot assignment unit for storing a plurality of count numbers of assigned timeslots. The timeslot assignment unit (a) determines a total value of count numbers stored in each entry of the timeslot count table, (b) receives the queue length indicating signal from each end-user system, (c) uses the total count number and the received queue length to determine a virtual queue length of each end-user system indicating a count number of packets in the buffer to which timeslots are still not assigned, (d) assigns timeslots to each end-user system based on the virtual queue length, and (e) stores a count number of the assigned timeslots in an entry of the timeslot count table corresponding to each end-user system.

According to a third aspect, the present invention provides a communication system comprising a plurality of end-user systems, and a timeslot assignment unit connected via a common transmission medium to the end-user systems. Each of the end-user systems comprises a buffer for storing packets of either variable or constant length, a queue length detector for detecting a queue length indicating a count number of said packets in the buffer, a memory having a length corresponding to a delay time of said timeslot assignment unit for storing a plurality of count numbers of assigned timeslots, and a controller. The controller directs the buffer to forward packets on timeslots assigned by the timeslot assignment unit, determines a total value of the count numbers stored in the memory, determines from the total value and the queue length a virtual queue length indicating a count number of packets in the buffer to which timeslots are still not assigned. The controller transmits a signal to said timeslot assignment unit for indicating the virtual queue length. The timeslot assignment unit receives the virtual queue length indicating signal from each end-user system and assigns timeslots to each end-user system based on the received virtual queue length.

BRIEF DESCRIPTION OF THE DRAWINGS

The present invention will be described in detail further with reference to the following drawings, in which.

DETAILED DESCRIPTION

Figure 1:
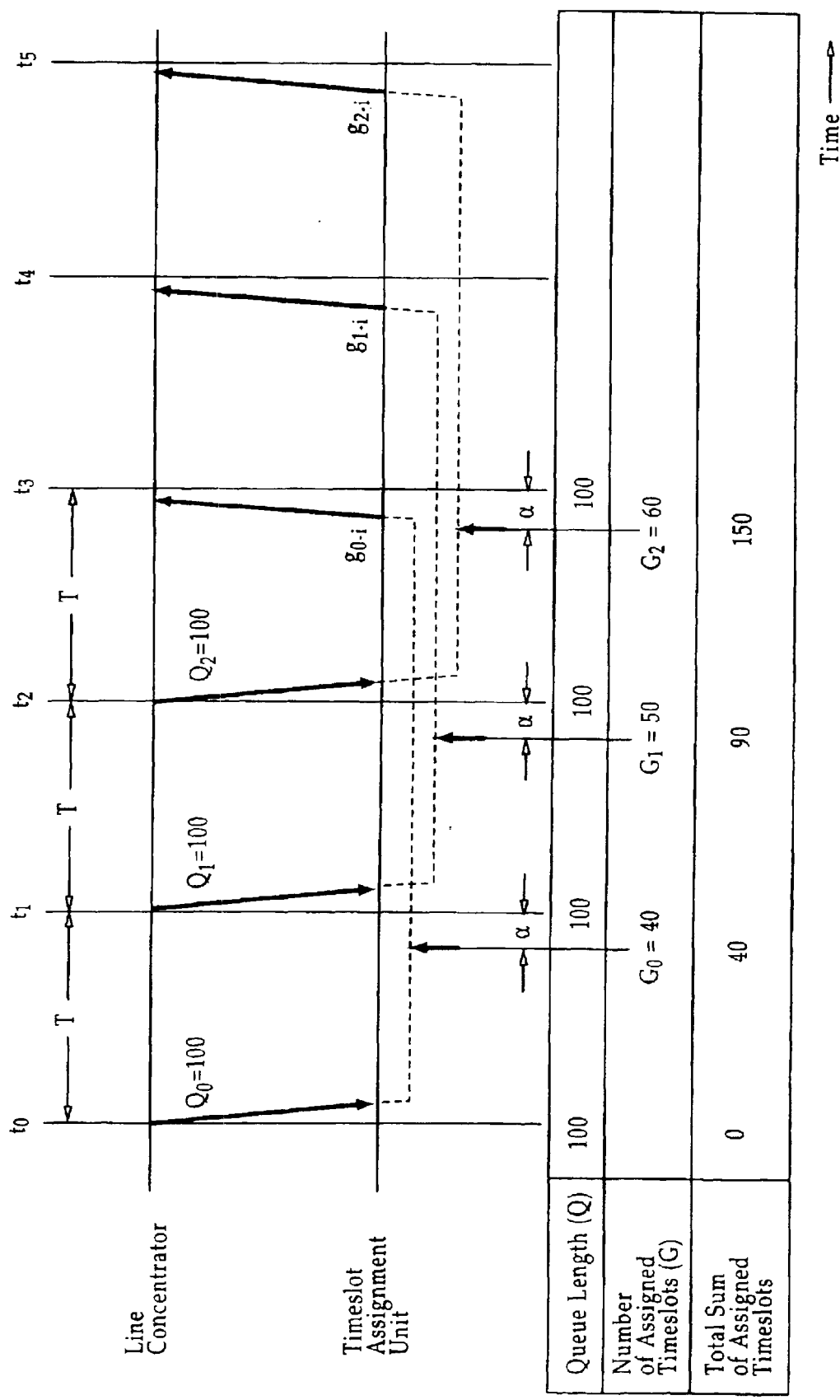
FIG. 1 is a timing diagram of a prior art slot assignment method.
Figure 2:
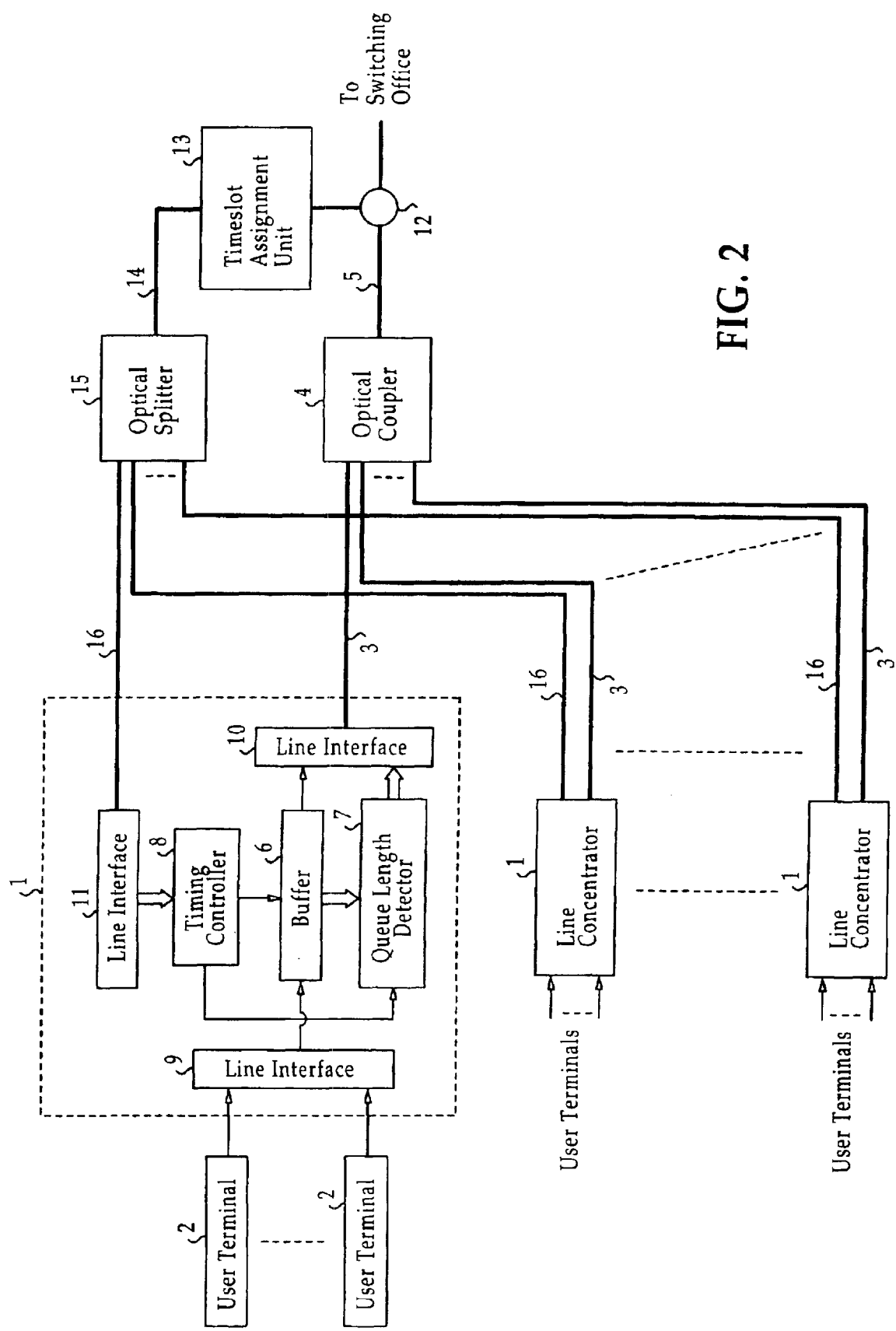
FIG. 2 is a block diagram of a point-to-multipoint communication system according to a first embodiment of the present invention.

Referring now to FIG. 2, there is shown an ATM-PON (asynchronous transfer mode-passive optical network) system, or a point-to-multipoint communication system according to a first embodiment of the present invention. On the user side of the system, end-user systems, or line concentrators 1 of identical configuration are located at or near user terminals 2 to multiplex (i.e., concentrate) their traffic to each of a plurality of optical local access lines 3, which are connected by an optical coupler 4 to a common optical transmission medium 5. Each line concentrator includes a buffer 6 for temporarily storing ATM cells received via a line interface 9 from the associated user terminals 2. A queue length detector 7 is connected to the buffer 6 to determine the number of cells that form a queue in the buffer waiting for transmission and communicates the queue length to the network. A timing controller 8 is provided in each line concentrator for controlling the buffer 6 to forward a cell on an assigned timeslot and the queue length detector 7 to transmit a queue length signal. A line interface 10 is provided for converting electrical signals from buffer 6 and detector 7 to corresponding optical signals for transmission to the access line 3.

On the network side, the transmission medium 5 is connected to a switching office of a switched communication network, now shown, via an optical splitter 12. A timeslot assignment unit 13 is connected to the transmission medium 5 to receive queue length signals from all line concentrators 1 via optical splitter 12 to provide timeslot assignment and sends timeslot position signals destined for respective line concentrators 1. These signals are sent via a common optical signaling line 14 and an optical splitter 15 to local optical signaling lines 16 to the line concentrators 1 for indicating the positions of respectively assigned timeslots within the interval of a frame.

In response to a timeslot position signal, the timing controller 8 of each line concentrator 1 directs the buffer 6 to forward an ATM cell on the assigned timeslot so that no data collisions occur on the common medium 5.

In addition, the time slot assignment unit 13 transmits a timing signal at periodic intervals to all line concentrators. In response to a timing signal, the timing controller 8 of each line concentrator 1 directs the queue length detector 7 to send its output to the timeslot assignment unit 13.

Figure 3:
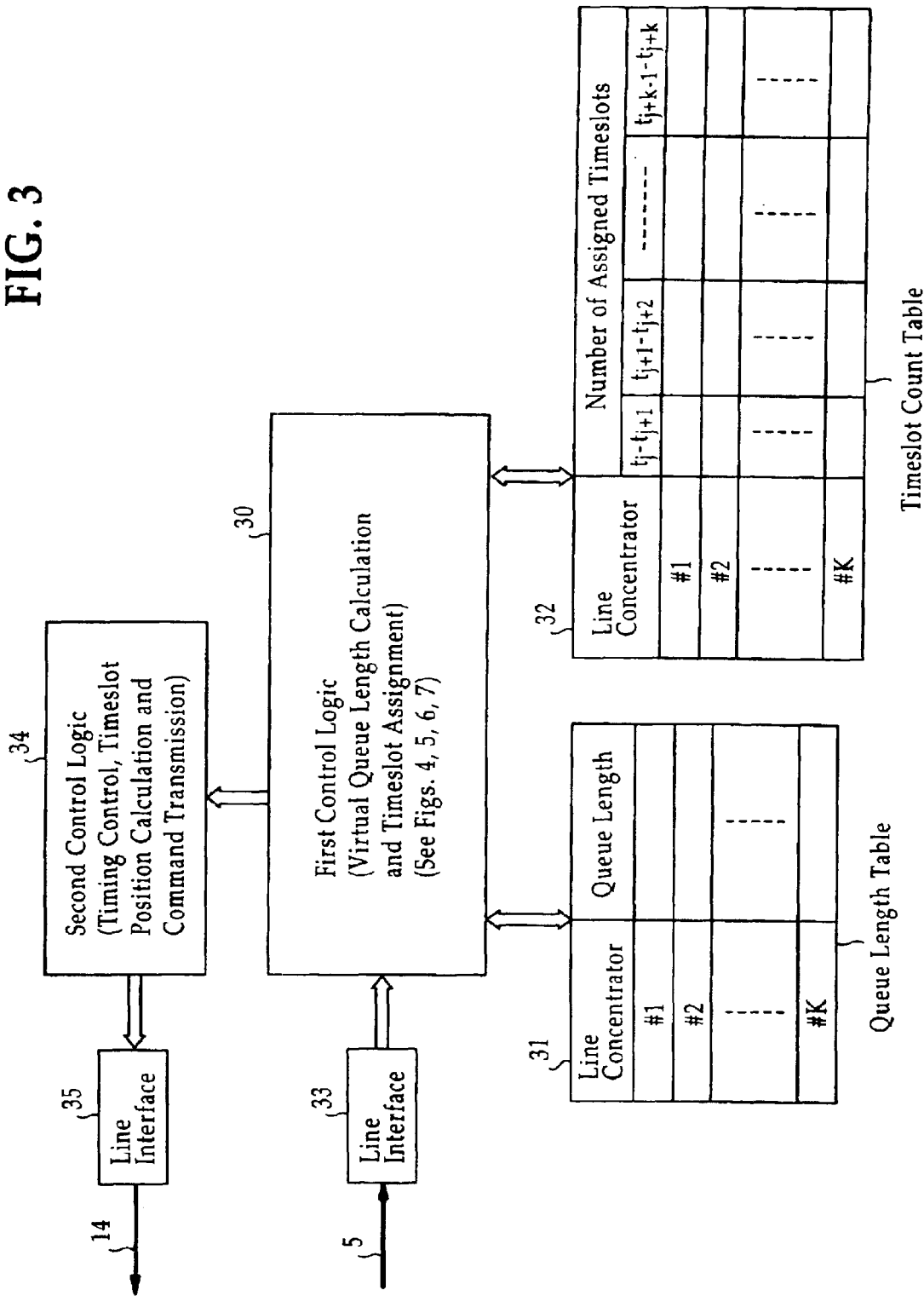
FIG. 3 is a block diagram of the timeslot assignment unit according to the first embodiment of the present invention.

As shown in detail in FIG. 3, the timeslot assignment unit 13 is comprised of a first control logic 30, a queue length table 31, a timeslot count table 32 and a second control logic 34. First control logic 30 receives queue length signals from the line concentrators 1 via a line interface 33. Queue length table 31 is segmented into a plurality of entries corresponding to the line concentrators. First control logic 30 stores the queue length values of the received signals into corresponding entries of queue length table 31. Timeslot count table 32 is also segmented into a plurality of entries corresponding to the line concentrators. Each entry of the timeslot count table 32 is sub-divided into a number of fields corresponding to "k" assignment update intervals $t_j-t_{j+1}$ to $t_{j+k-1}-t_{j+k}$, where j represents the current time interval. The time interval between $t_j$ to $t_{j+k}$ represents the delay time which the second control logic 34 usually takes to process and transmit timeslot position signals plus the propagation delay time between the timeslot assignment unit and the line concentrators and their data processing times, and so on. As will be described, the first control logic 30 stores a count number of timeslots assigned to a given line concentrator during a given update interval into a field of the timeslot count table 32 that corresponds to the given line concentrator and the given time interval. Timeslot count table 32 is therefore a past record of assigned-timeslot count numbers over "k" update intervals. Then, the control logic 30 supplies the count number of timeslots assigned to each line concentrator to the second control logic 34, which determines the positions of assigned timeslots within a frame and transmits a signal representing the timeslot positions to each line concentrator via a line interface 35 and the common signaling line 14. Second control logic 34 also functions to transmit a timing signal to the line concentrators via the signaling line at periodic intervals corresponding to update intervals of the first control logic 30 in order to urge the line concentrators to return a queue length signal.

The operation of first control logic 30 proceeds according to the flowcharts shown in FIGS. 4 to 7.

Figure 4:
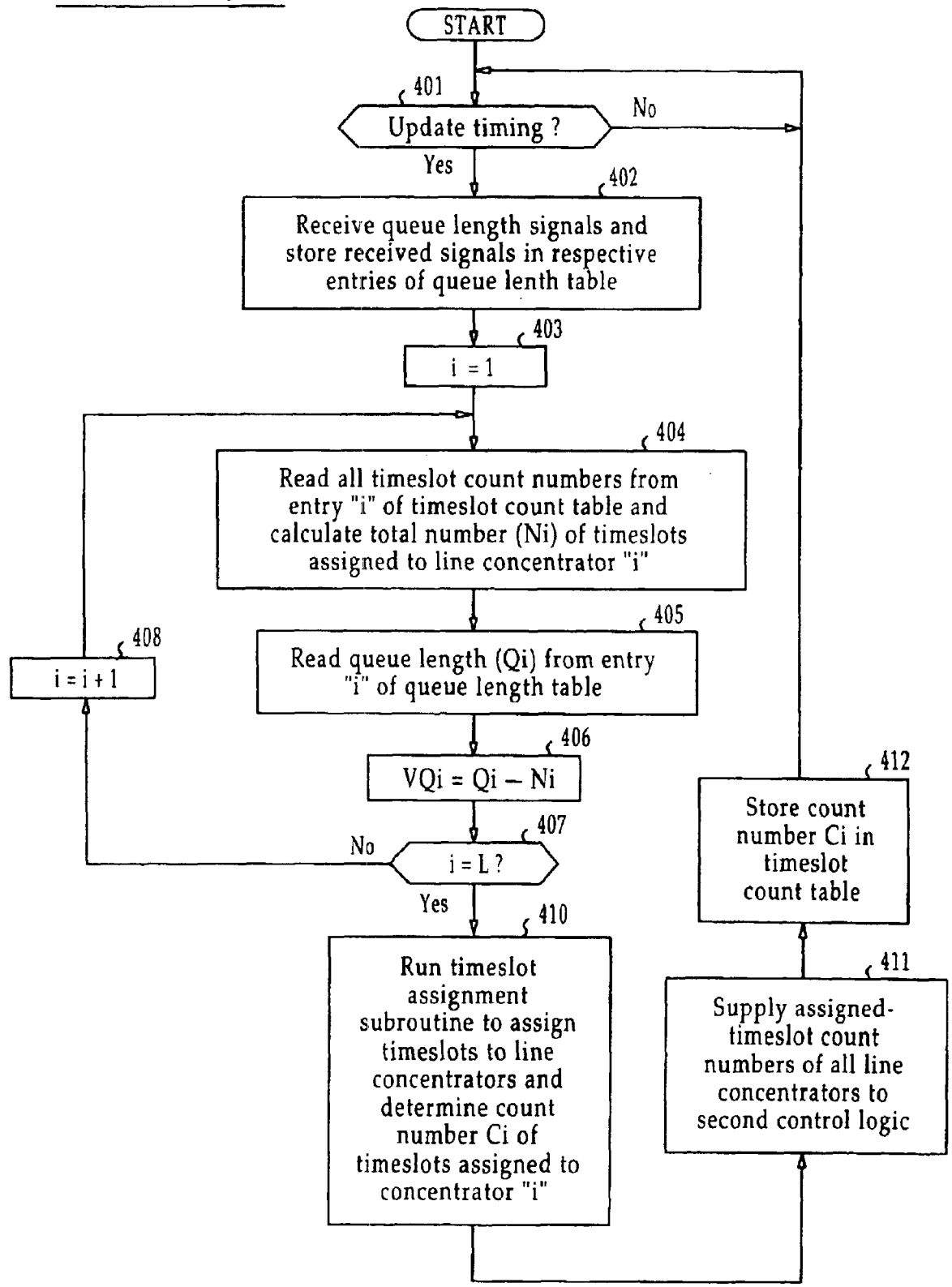
FIG. 4 is a flowchart of the operation of the control logic of FIG. 3.

In FIG. 4, the control logic 30 monitors a timing source, not shown, for updating assigned timeslots at step 401. In response to a timing pulse, the control logic 30 proceeds to step 402 to receive queue length signals on predetermined timeslots from the line concentrators indicating the queue lengths of their outstanding cells and stores the queue length values into corresponding entries of the queue length table 31.

At step 403, a variable "i" is set equal to one, where "i" identifies a line concentrator. Control logic 30 then reads all timeslot count numbers from the entry "i" of timeslot count table 32 and calculate the total number Ni of timeslots assigned to the line concentrator "i" during previous "k" update intervals (step 404).

Control logic 30 reads the queue length value Qi from the entry "i" of queue length table 31 (step 405) and calculates the difference between Qi and Ni as a "virtual" queue length VQi of the line concentrator "i" (step 406). Steps 404 to 406 are repeated to produce virtual queue lengths for all line concentrators by incrementing the variable "i" (step 408) until it equals the number of all line concentrators represented by the integer L (step 407).

Next, the control logic 30 performs a timeslot assignment subroutine 410. As described in detail, the control logic 30 assigns timeslots according to an algorithm and determines the number of timeslots (Ci) assigned to each line concentrator as will be described in FIGS. 5, 6 and 7 based on the virtual queue length values of the line concentrators.

At step 411, the first control logic 30 supplies the number of timeslots assigned to each line concentrator to the second control logic 34. The latter determines the positions of the assigned timeslots within a frame and transmits signals each representing the timeslot positions to the line concentrators over the common signaling medium 14. At step 412, all contents of timeslot count table 32 are shifted by one column so that the oldest data are deleted and a new column of fields is vacated for storing the timeslot count numbers Ci as most recent timeslot count values. Control logic 30 now returns to the starting point of the routine.

Figure 5:
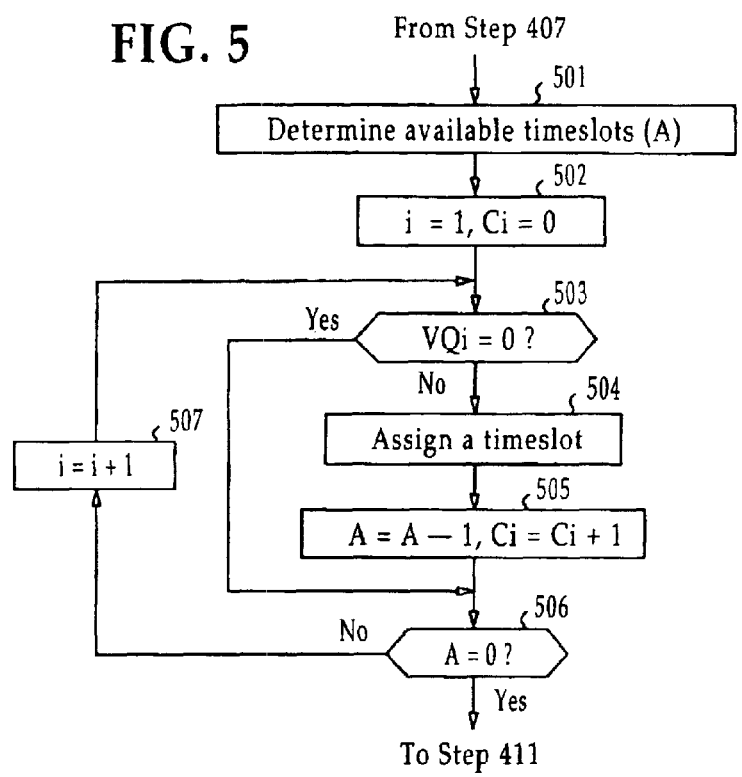
FIG. 5 is a flowchart of a first form of the timeslot assignment subroutine of FIG. 4.

FIG. 5 illustrates one embodiment of timeslot assignment subroutine 410 in which timeslots are assigned on a round-robin bases. At step 501, the control logic 30 determines the number of available timeslots (A) that can be assigned.

At step 502, the variable "i" is set equal to one and a count value Ci of the line concentrator "i" is set equal to zero. Decision step 503 is then executed by checking to see if the virtual queue length VQi of the line concentrator "i" is zero. If VQi is positive, the decision at step 503 is negative and the control logic assigns one timeslot to line concentrator "i" at step 504. At step 505, the available timeslot number A is decremented by one and the count value Ci is incremented by one. If VQi is zero, the control logic assigns no timeslots and skips steps 504 and 505. By incrementing the variable "i", round-robin assignment steps 503 to 505 will be repeated until the available timeslots reduce to zero (steps 506, 507). Therefore, timeslots are assigned on a round-robin basis to those line concentrators whose virtual queue lengths are positive.

Figure 6:
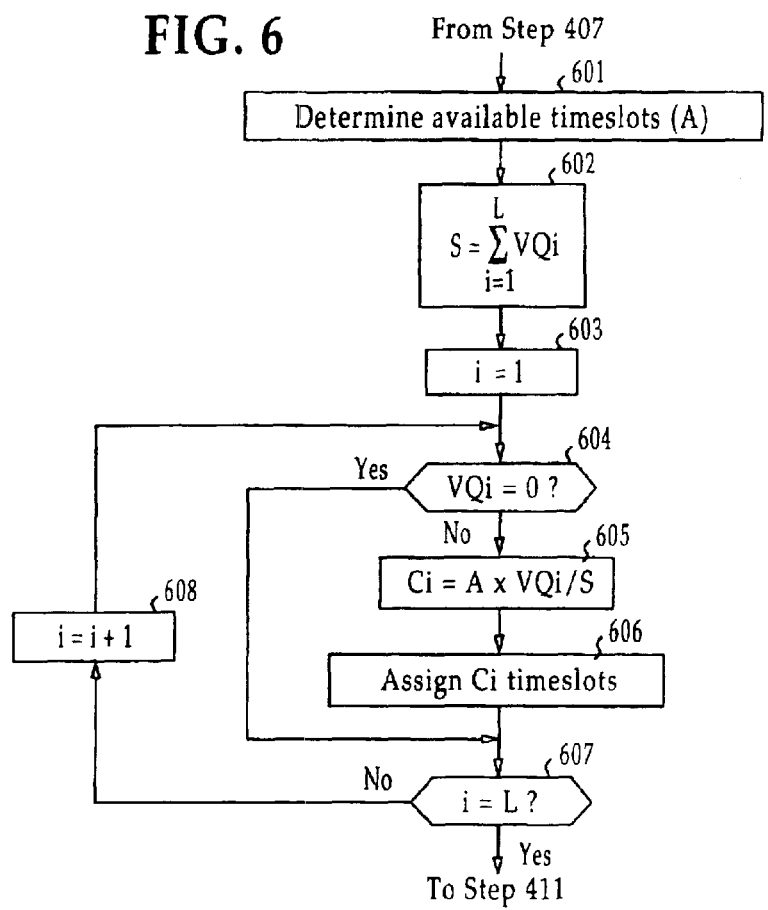
FIG. 6 is a flowchart of a second form of the timeslot assignment subroutine.

In FIG. 6, the control logic 30 assigns timeslots to each line concentrator by an amount proportional to its virtual queue length. When the available timeslots A is determined (step 601), a total value S of virtual queue lengths VQi of all line concentrators is calculated (step 602). Variable "i" is set equal to 1 (step 603) and the VQi value is tested (step 604) to see if it is positive or zero. If VQi is positive, flow proceeds to step 605 to calculate a count number of timeslots $C_i = A \times VQ_i / S$. Control logic 30 assigns Ci timeslots to line concentrator "i" (step 606). If VQi is zero, the control logic assigns no timeslots and skips steps 605 and 606. By incrementing the variable "i", assignment steps 604 to 606 will be repeated until all line concentrators are tested (steps 607, 608).

Figure 7:
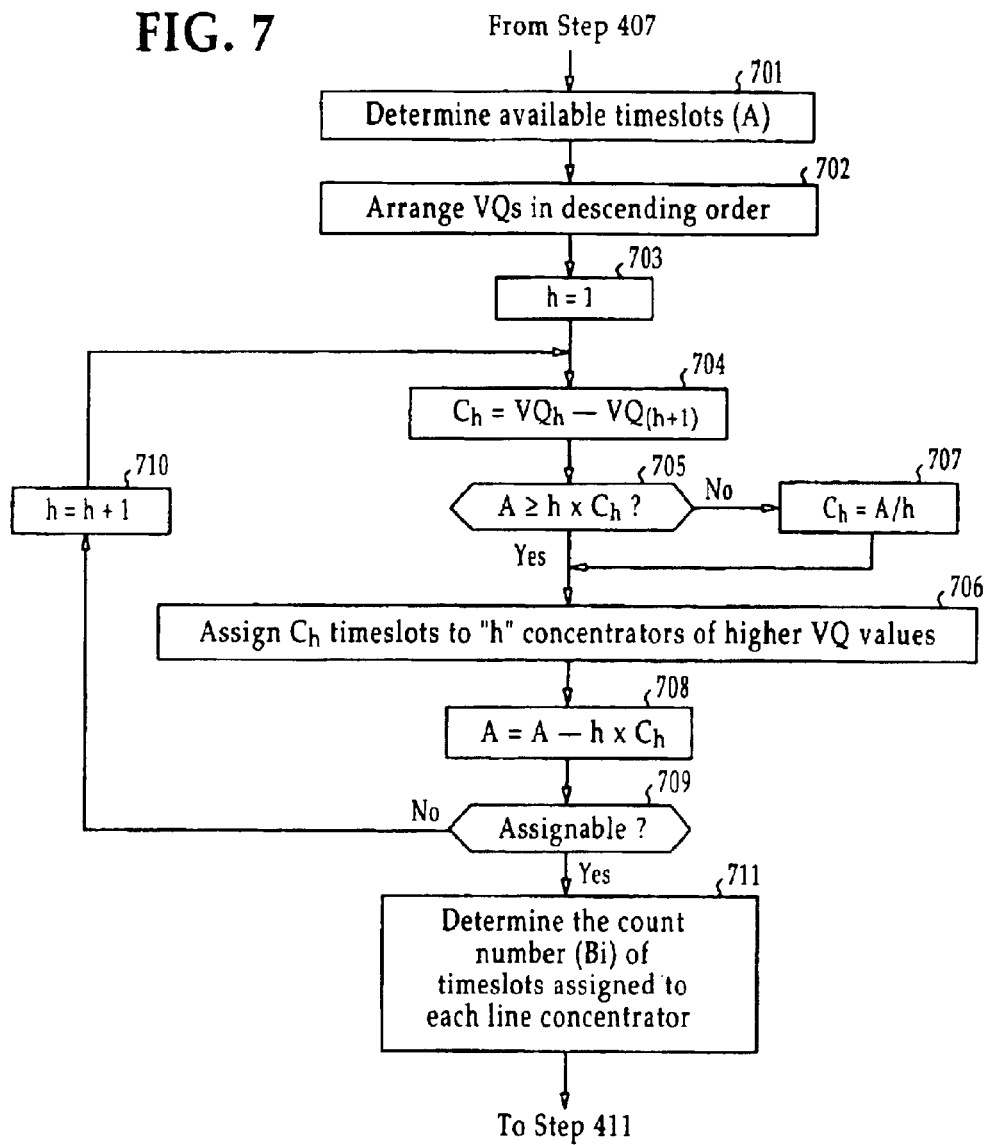
FIG. 7 is a flowchart of a third form of the timeslot assignment subroutine.

In FIG. 7, the control logic 30 assigns timeslots such that the virtual queue lengths of all line concentrators will be averaged out. Initially, the control logic 30 determines the number of available timeslots (A) at step 701, arranges the VQ values in descending order (step 702) and sets a variable "h" to one, with h=1 representing the highest of the VQ values. At step 704, the difference between $VQ_h$ and $VQ_{(h+1)}$ is determined as a count number $C_h$ of timeslots to be assigned. At step 705, the control logic determines whether the number of available timeslots is equal to or greater than a total number of timeslots to be assigned which equals $h \times C_h$. If $A \geq h \times C_h$, flow proceeds from step 705 to 706 to assign $C_h$ timeslots to "h" line concentrators of higher VQ values. If $A \leq h \times C_h$, the count number $C_h$ is set equal to A/h at step 707 and flow proceeds to step 706 to assign A/h timeslots to the "h" line concentrators. At step 708, the available timeslot count number A is decreased by the number of assigned timeslots $C_h$ in order to update its value as a remaining timeslot resource. Decision step 709 then determines whether the remaining resource A is equal to or smaller than the smallest of the VQ values. If the decision at step 709 is negative, the variable "h" is incremented by one (step 710) and the routine returns to step 704 to repeat the assignment process on the line concentrator of next highest VQ value. If the remaining resource A is smaller than the smallest of the VQ values, decision step 711 is executed to determine the total number Ci of timeslots assigned to each line concentrator.

Figure 8:
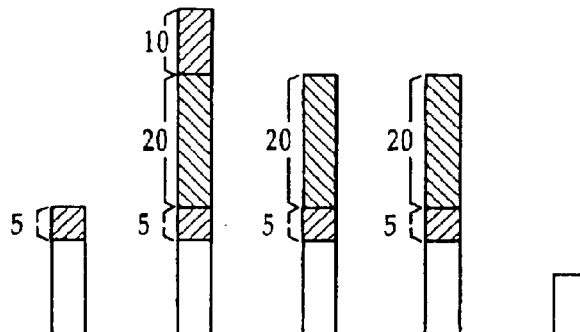
FIG. 8 is a view for illustrating the operation of the assignment subroutine of FIG. 7.

For example, assume that the number of available timeslots is initially 90 and line concentrators 1a, 1b, 1c, 1d and 1e have virtual queue length values 20, 50, 40, 40 and 10, respectively, as shown in FIG. 8. Thus, the following timeslots are assigned:

When h=1, $C_1 = 50-40 = 10$ assigned to concentrator 1b,

When h=2, $C_2 = 40-40 = 0$ (no timeslots are assigned),

When h=3, $C_3 = 3 \times (40-20) = 60$ assigned to concentrators 1b, 1c, 1d,

When h=4, $C_4 = 4 \times 20/4 = 20$ assigned to concentrators 1a, 1b, 1c, 1d.

In this way, VQ values are averaged out and their variability among the line concentrators is reduced. Therefore, each line concentrator is not required to maintain a buffer of large storage capacity.

Figure 9:
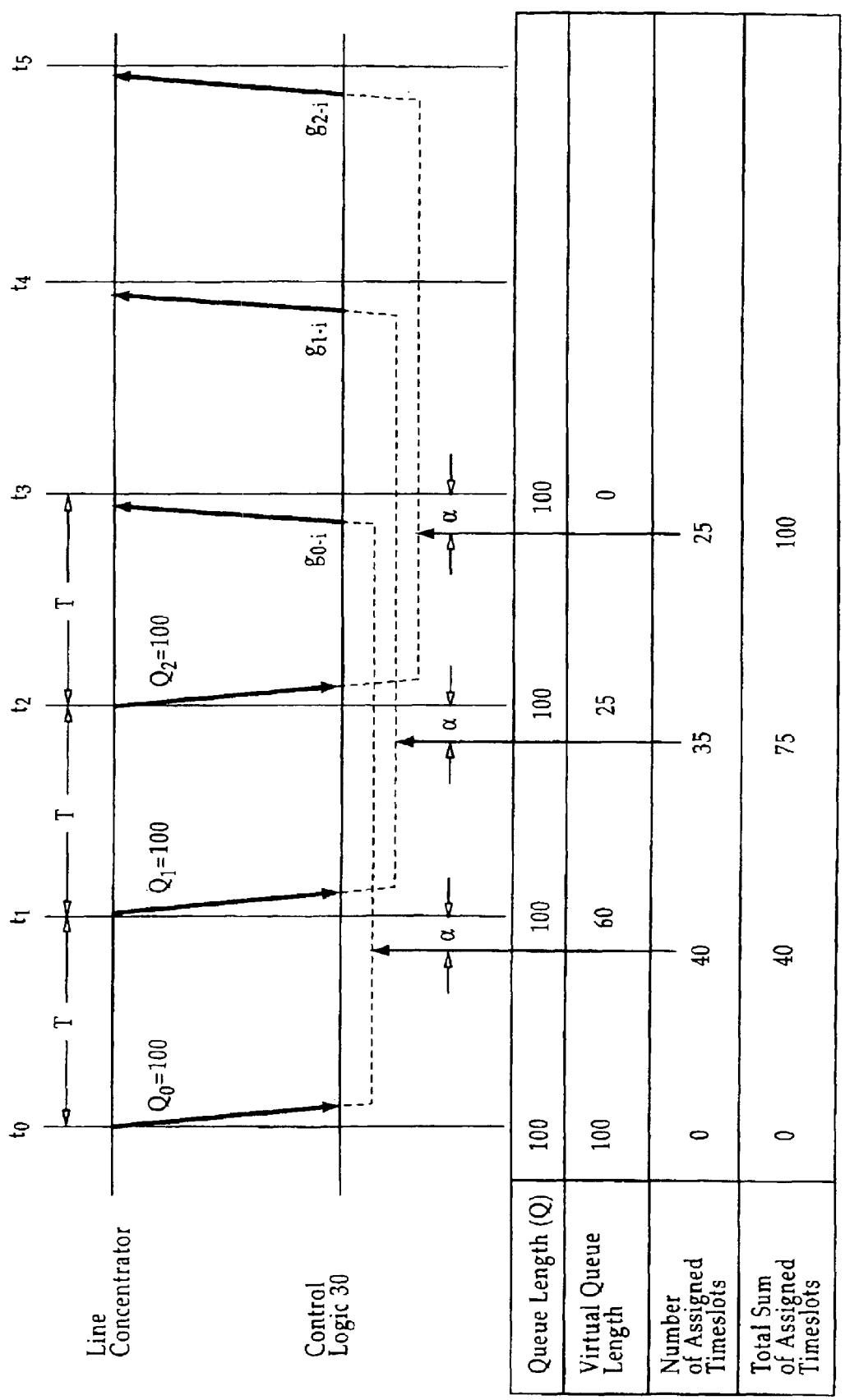
FIG. 9 is a timing diagram for illustrating the operation of the present invention.

The operation of a line concentrator of the present invention will be understood by the following description with reference to a time sequence diagram shown in FIG. 9.

Assume that the line concentrator has a queue length value 100 at update times $t_0$, $t_1$ and $t_2$. First control logic 30 initially determines that virtual queue length (VQ) value is equal to 100. Since no timeslots are assigned during the first interval $t_0$ to $t_1$, 40 timeslots may be assigned to the line concentrator at time $t_1-\alpha$. The VQ value of the concentrator at time $t_1$ thus equals 60. Using the VQ value which is smaller than the original VQ value of 100, the control logic 30 may assign a smaller number of timeslots, 35, for example, at time $t_2-\alpha$, resulting in a VQ=25 at time $t_2$. With VQ=25, the control logic may assign 25 timeslots and transmits at $t_3-\alpha$, leaving a VQ=0 at time $t_3$. The count numbers 40, 35 and 25 of assigned timeslots are respectively supplied to the second control logic 34 at times $t_1-\alpha$, $t_2-\alpha$, and $t_3-\alpha$. Due to the inherent delay time involved with the timeslot position calculation, the second control logic 34 produces a timeslot position signal $g_{0-i}$ at time $t_3-\alpha$ in response to the assigned slot count number=40 following a delay time of two update intervals. However, the total number of timeslots assigned to the line concentrator at time $t_3$ equals the queue length value of 100. Thus, timeslots are not repeatedly assigned to the same outstanding cells.

Figures 10, 11:
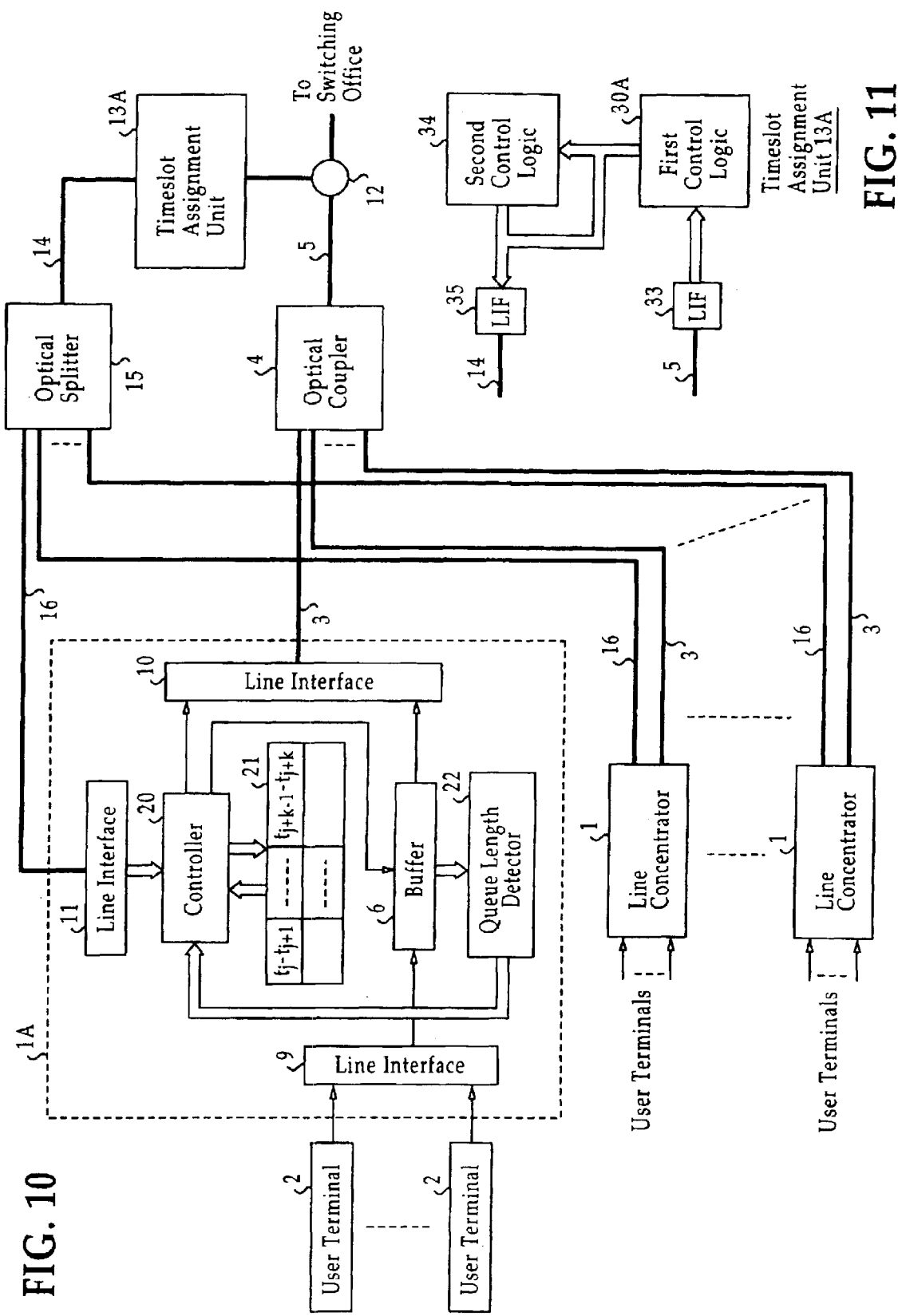
FIG. 10 is a block diagram of a communication system according to a modified embodiment of the present invention.
FIG. 11 is a block diagram of the timeslot assignment unit of FIG. 10.

A modified embodiment of the present invention is shown in FIGS. 10 to 13. This embodiment differs from the previous embodiment in that each of the line concentrators has a controller 20, a timeslot count memory 21 and a queue length detector 22, as shown in FIG. 10. Controller 20 of each line concentrator determines its own virtual queue length by using data stored in the timeslot count memory 21 and the output of the queue length detector 22 and informs the timeslot assignment unit 13A of the VQ value. Similar to each entry of the timeslot count table 32, the timeslot count memory 21 stores a count number of timeslots assigned during an update interval $t_j - t_{j+1}$ into one of its fields.

On the other hand, the timeslot assignment unit 13A shown in FIG. 11 is similar to the previous embodiment with the exception that the tables 31 and 32 of the previous embodiment are dispensed with and the first control logic 30A is associated with the second control logic 34 and the line interface 35.

Figure 12:
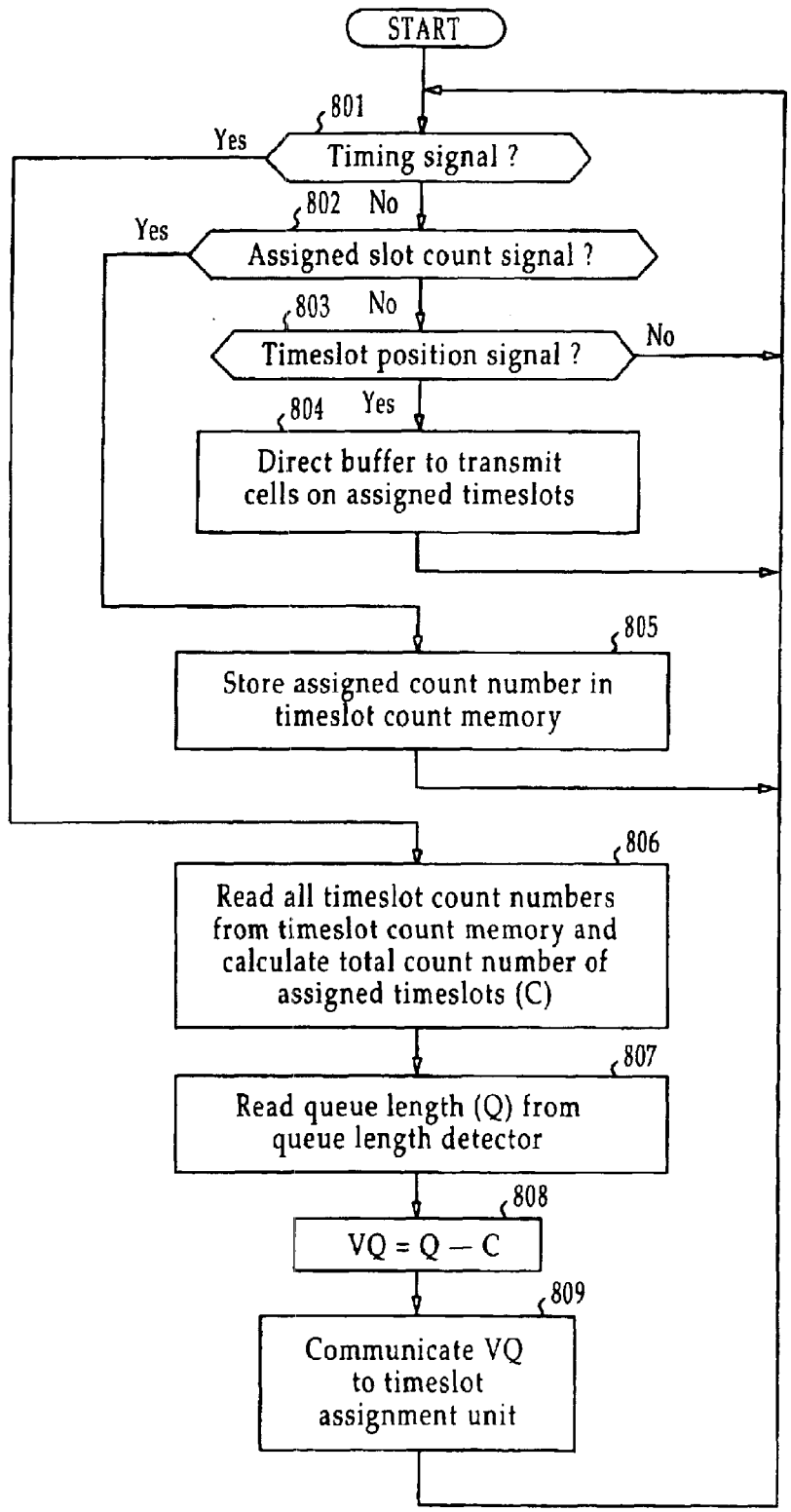
FIG. 12 is a flowchart of the operation of the line concentrators of FIG. 10.

The operation of the controller 20 of each line concentrator of FIG. 10 proceeds according to the flowchart of FIG. 12. Controller 20 monitors its local signaling line to detect a broadcast timing signal and an assigned slot count and a timeslot position signal that are addressed to its own line concentrator (steps 801, 802 and 803). If a timeslot position signal is received (step 803), the controller 20 directs the buffer 6 to transmit cells on the timeslots specified by the position signal (step 804) and returns to the starting point of the routine.

If an assigned slot count signal is received (step 802), flow proceeds to step 805 to store the count number contained in the received signal into the timeslot count memory 21 and returns to the starting point of the routine.

If a timing signal is received (step 801), the controller proceeds to step 806 and reads all timeslot count numbers from the timeslot count memory 21 and calculate a total count number of the assigned timeslots (C). At next step 806, the controller 20 reads a current queue length value (Q) from the queue length detector 22 (step 807) and determines a virtual queue length (VQ) value by subtracting C from the value Q (step 808) and communicates this VQ value to the timeslot assignment unit 13A (step 809). Controller 20 then returns to the starting point of the routine.

Figure 13:
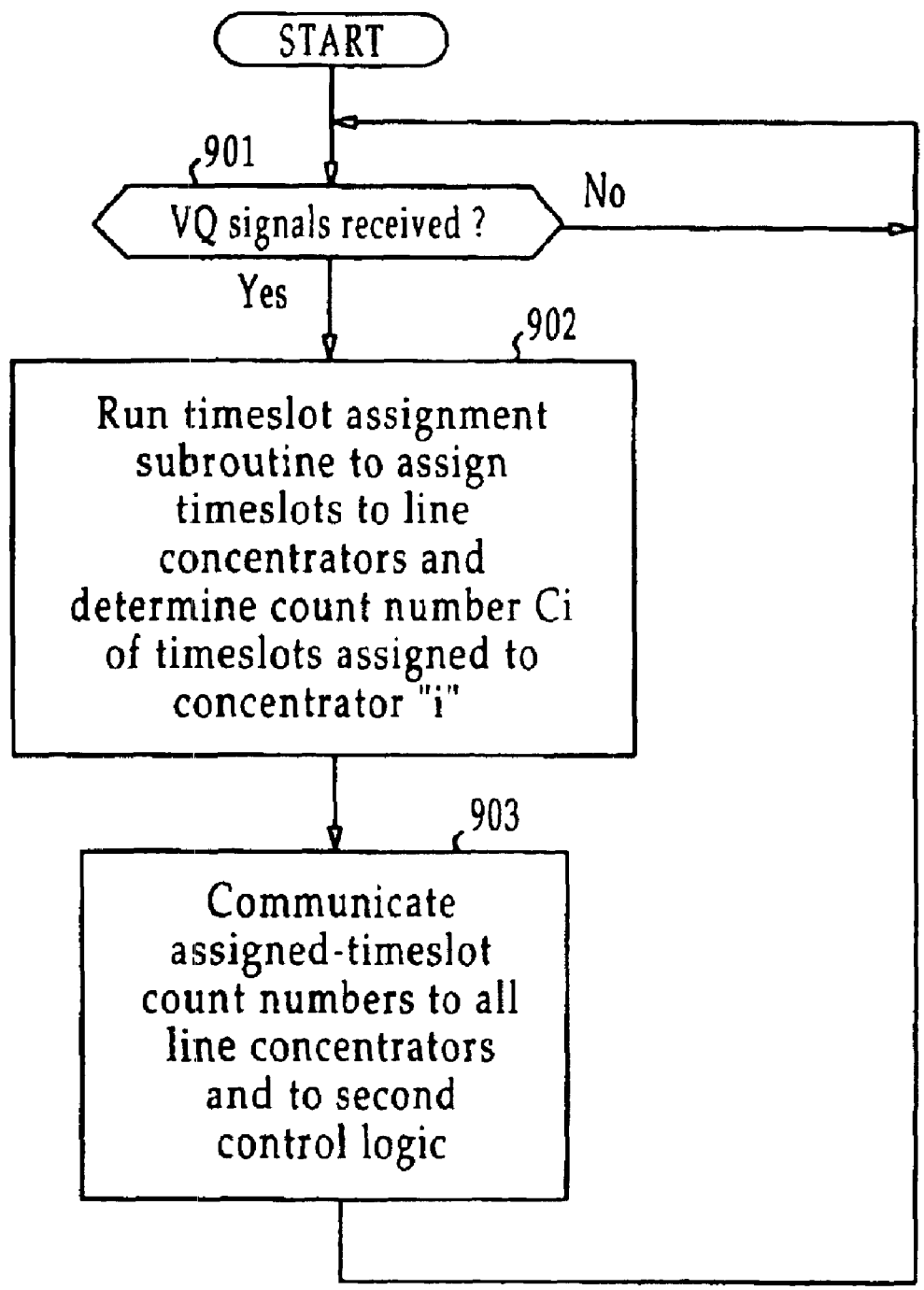
FIG. 13 is a flowchart of the operation of the first control logic of FIG. 11.

The operation of the first control logic 30A of FIG. 11 proceeds according to the flowchart of FIG. 13. Control logic 30A receives VQ signals and count numbers from the line concentrators (step 901). By using the VQ values from the line concentrators, the control logic 30A executes timeslot assignment subroutine 902 in a manner as described previously and determines a count number Ci of timeslots assigned to a line concentrator "i". At step 903, the first control logic 30A communicates the assigned-timeslot count numbers respectively to all line concentrators via the line interface 35 and communicates the same information to the second control logic 34 for timeslot position calculation and transmission of position signals to the line concentrators.

While mention has been made of embodiments in which ATM cells (packets of constant length) are discussed, the present invention could also be applied to a communication system in which packets of variable length are used. In such instances, packet length information is transmitted from the line concentrators to the timeslot assignment unit to determine the number of timeslots to be assigned to outstanding packets in the line concentrators.

What is claimed is:

1. A timeslot assignment method for a communication system in which a plurality of end-user systems are connected to a timeslot assignment unit via a common transmission medium, each of said end-user systems comprising a buffer for storing packets of either variable or constant length- and forwarding packets from said buffer on assigned timeslots, the method comprising the steps of:
   a) determining a first count number of said packets in the buffer of each of said end-user systems;
   b) determining a second, total count number of timeslots previously assigned to each end-user system during a delay time period of said timeslot assignment unit;
   c) using said first and second count numbers for determining a third count number of packets in said buffer to which timeslots are still not assigned; and
   d) assigning timeslots to packets of each end-user system based on an order of rank of third count numbers of respective ones of said plurality of end-user systems.

2. A timeslot assignment method as claimed in claim 1, wherein said third count number equals a difference between said first and second count numbers.

3. A timeslot assignment method as claimed in claim 1, wherein the step (d) assigns said timeslots on a round-robin basis.

4. A timeslot assignment method as claimed in claim 1, wherein the step (d) assigns said timeslots in proportion to said third count number.

5. A timeslot assignment method as claimed in claim 1, wherein the step (d) comprises the steps of:
   $d_1$) arranging the third count numbers of said end-user systems in descending order of rank;
   $d_2$) setting integer N to one;
   $d_3$) detecting a difference between the third count number arranged in a rank represented by the integer N and the third count number arranged in a rank represented by integer (N+1);
   $d_4$) assigning timeslots corresponding in number to said difference to packets of N end-user systems whose third count numbers are arranged in said descending order; and
   $d_5$) incrementing the integer N by one and repeating the steps ($d_3$) and ($d_4$).

6. A timeslot assignment method as claimed in claim 1, wherein said packets are ATM cells.

7. A communication system comprising:
   a plurality of end-user systems; and
   a timeslot assignment unit connected via a common transmission medium to said end-user systems, each of said end-user systems comprising:
- a buffer for storing packets of either variable or constant length;
- a queue length detector for detecting a queue length indicating a count number of said packets in the buffer; and
- a controller for forwarding packets from said buffer on timeslots assigned by said timeslot assignment unit and transmitting a signal to said timeslot assignment unit for indicating the detected queue length, said timeslot assignment unit comprising:
- a timeslot count table having a plurality of entries corresponding to said end-user systems, each of the entries having a length corresponding to a delay time period of said timeslot assignment unit for storing a plurality of count numbers of assigned timeslots; and
- a controller for (a) determining a total value of count numbers stored in each entry of said timeslot count table, (b) receiving the queue length indicating signal from each of said end-user systems, (c) using said total count number and the received queue length for determining a virtual queue length of each end-user system indicating a count number of packets in said buffer to which timeslots are still not assigned, (d) assigning timeslots to each end-user system based on an order of rank of virtual queue lengths of respective ones of said plurality of end-user systems, and (e) storing a count number of the assigned timeslots in an entry of said timeslot count table corresponding to said each end-user system.

8. A communication system as claimed in claim 7, wherein said virtual queue length equals a difference between said total count number and the received queue length.

9. A communication system as claimed in claim 7, wherein the timeslot assignment unit assigns said timeslots on a round-robin basis.

10. A communication system as claimed in claim 7, wherein the timeslot assignment unit assigns aid timeslots in proportion to said virtual queue length.

11. A communication system as claimed in claim 7, wherein the timeslot assignment unit performs the functions of:
- arranging the virtual queue lengths of said end-user systems in descending order of rank, setting integer N to one;
- detecting a difference between the virtual queue length arranged in a rank represented by the integer N and virtual queue length arranged in a rank represented by integer (N+1);
- assigning timeslots corresponding in number to said difference to packets of N end-user systems whose virtual queue lengths are arranged in said descending order; and
- incrementing the integer N by one and repeating the functions of detecting said difference and assigning said timeslots.

12. A communication system as claimed in claim 7, wherein said packets are ATM cells.

13. A communication system comprising:
- a plurality of end-user systems; and
- a timeslot assignment unit connected via a common transmission medium to said end-user systems, each of said end-user systems comprising:
- a buffer for storing packets of either variable or constant length;
- a queue length detector for detecting a queue length indicating a count number of said packets in the buffer;
- a memory having a length corresponding to a delay time of said timeslot assignment unit for storing a plurality of count numbers of assigned timeslots; and
- a controller for forwarding packets from said buffer on timeslots assigned by said timeslot assignment unit, determining a total value of the count numbers stored in said memory, determining, from said total value and said queue length, a virtual queue length indicating a count number of packets in said buffer to which timeslots are still not assigned, and transmitting a signal to said timeslot assignment unit for indicating the virtual queue length, said transmission assignment unit receiving the virtual queue length indicating signal from each of said end-user systems and assigning timeslots to each end-user system based on an order of rank of received virtual queue lengths of respective ones of said plurality of end-user systems.

14. A communication system as claimed in claim 13, wherein said virtual queue length equals a difference between said queue length and said total value.

15. A communication system as claimed in claim 13, wherein the timeslot assignment unit assigns said timeslots on a round-robin basis.

16. A communication system as claimed in claim 13, wherein the timeslot assignment unit assigns said timeslots in proportion to said virtual queue length.

17. A communication system as claimed in claim 13, wherein the timeslot assignment unit performs the functions of:
- arranging the virtual queue lengths of said end-user systems in descending order of rank, setting integer N to one;
- detecting a difference between the virtual queue length arranged in a rank represented by the integer N and the virtual queue length arranged in a rank represented by integer (N+1);
- assigning timeslots corresponding in number to said difference to packets of N end-user systems whose virtual queue lengths are arranged in said descending order; and
- incrementing the integer N by one and repeating the functions of detecting said difference and assigning said timeslots.

18. A communication system as claimed in claim 13, wherein said timeslot assignment unit comprises:
- a first controller for transmitting a signal to each of said end-user systems for indicating a count number of said assigned timeslots for storing the count number into the memory of each end-user system; and
- a second controller for transmitting a position signal representing timeslot positions of the timeslots assigned by the first controller to each of said end-user systems.

19. A communication system as claimed in claim 13, wherein said packets are ATM cells.

* * * * *